United States Patent [19]

Warmack et al.

[11] Patent Number: 4,639,901

[45] Date of Patent: Jan. 27, 1987

[54] METHOD FOR TESTING CABLELESS SEISMIC DIGITAL FIELD RECORDERS

[75] Inventors: Ralph E. Warmack, Kingwood, Tex.; William D. Woodruff, Tulsa, Okla.

[73] Assignee: Standard Oil Company, Chicago, Ill.

[21] Appl. No.: 454,404

[22] Filed: Dec. 29, 1982

[51] Int. Cl.$^4$ .......................... G01V 1/16; H04B 17/00
[52] U.S. Cl. ........................................ 367/13; 73/1 R; 346/33 C; 367/77
[58] Field of Search ...................... 346/14 MR, 33 C; 340/653, 582; 364/571, 580; 367/13, 65, 67, 76, 77, 59, 62; 324/73 R; 73/1 DV, 1 R

[56] References Cited

U.S. PATENT DOCUMENTS

| | | | |
|---|---|---|---|
| 2,688,124 | 8/1954 | Doty et al. | 367/41 |
| 3,806,864 | 4/1974 | Broding et al. | 367/77 |
| 3,946,357 | 3/1976 | Weinstein et al. | 367/77 |
| 3,952,283 | 4/1976 | Broding | 367/76 |
| 4,017,833 | 4/1977 | Broding | 367/77 |
| 4,257,098 | 3/1981 | Lacy | 367/74 |
| 4,281,403 | 7/1981 | Siems et al. | 367/76 |
| 4,455,654 | 6/1984 | Bhaskar et al. | 324/73 R |
| 4,493,063 | 1/1985 | Tims et al. | 367/77 |

OTHER PUBLICATIONS

Rothero, "A Portable Digital Seismic Recorder with Event Recording Capability", Bulletin of the Seismological Society of Amer., vol. 66, No. 3, pp. 979-985, Jun. (1976).

*Primary Examiner*—Salvatore Cangialosi
*Assistant Examiner*—Ian J. Lobo
*Attorney, Agent, or Firm*—Timothy D. Stanley

[57] ABSTRACT

Test features are incorporated in an improved cableless seismic digital recording system recorder. The improved recorder facilitates application of earlier cableless seismic digital recording systems to situations in which seismic-trace data is generated by low energy surface seismic sources, such as vibrators and hammers. A seismometer, or geophone, is connected to a remotely deployed radio-controlled portable recorder which contains circuitry for sampling, digitizing, processing, storing, and recording seismic-trace data. Coded radio signals instruct the recorder to commence an operation or sequence of operations from a predetermined set of programmed instructions stored in program read only memory included in the recorder. Such operations include data acquisition; optional weighting and vertical stacking (summing); normalization; recording; and seismic source initiation. Test features include control panel display of operational status and verification of gain-ranging amplifier operation.

4 Claims, 8 Drawing Figures

A)  IPW(0).  THIS IS A 15 Hz WAVEFORM.

B)  IPW(1).  THESE ARE DIFFERENT PHASE MIXES OF 15 Hz AND 30 Hz AT EQUAL AMPLITUDES.

C)  IPW(2) AND IPW(4).  THESE ARE BOTH 30 Hz WAVEFORMS.

NOTE:  THE RELATIVE AMPLITUDE OF THESE TRACES HAS NO SIGNIFICANCE.

FIG.6

METHOD FOR TESTING CABLELESS SEISMIC DIGITAL FIELD RECORDERS

BACKGROUND OF THE INVENTION

This invention relates to geophysical exploration for petroleum and minerals. More particularly, this invention is directed to geophysical prospecting by means of the seismic technique.

Seismic prospecting involves generating seismic waves at the surface of the earth by means of a seismic source. The seismic waves travel downward into the earth and are reflected and/or refracted due to differences in acoustic impedance at the interfaces of various subsurface geological formations. Detectors, called seismometers, or geophones, located along the surface of the earth and/or in a borehole produce analog electrical seismic-trace signals in response to detected seismic wave reflections and/or refractions. The analog electrical seismic-trace signals from the seismometers, or geophones, can then be recorded. Alternatively, the analog electrical seismic-trace signals from the seismometers, or geophones, can be sampled and digitized prior to being recorded. The seismic-trace data recorded in iether manner is subsequently processed and analyzed for determining the nature and structure of the subsurface formations. Specifically, this invention is directed to testing the operability of the recorder of a cableless seismic digital recording system used for acquiring and processing seismic-trace data.

The cableless seismic digital recording system is a field system developed for seismic prospecting for digitally recording seismic-trace signals produced by seismometers, or geophones, without the need for multi-conductor cables or alternate means such as multi-channel radio telemetry for transmitting seismic-trace data to a central recording point. In particular, the cableless seismic digital recording system includes small, portable recorders placed near the seismometer, or geophone, locations and arranged for producing individual recordings in response to control signals transmitted from a control point over a communications link, preferably a radio communications link. Cableless seismic digital recording systems are disclosed in Broding et al. U.S. Pat. No. 3,806,864 and Weinstein et al. U.S. Pat. No. 3,946,357 hereby incorporated by reference into this specification to form a part thereof.

Broding et al. U.S. Pat. No. 3,806,864, for example, discloses a cableless seismic digital recording system wherein out of a large array of recorders remotely deployed in a prospect area only those recorders needed for producing a given set of recording are selectively activated over a radio communications link and caused to record seismic-trace data. The remaining recorders remain essentially quiescent until there is a desire to produce a set of recordings for the prospect areas where they are situated. As disclosed in Broding et al. U.S. Pat. No. 3,806,864, the seismic-trace data is preferably recorded on a magnetic tape cartridge.

Since the recorders of the cableless seismic digital recording system disclosed in Broding et al. U.S. Pat. No. 3,806,864 are remotely deployed and activated by a radio communications link, from a practical standpoint operation of the recorders cannot be monitored during seismic prospecting. Consequently, Broding U.S. Pat. No. 3,952,283 discloses that when the seismometers, or geophones, and associated recorders are deployed, the individual recorders are activated (for example, by a radio transmitter or the like), and each activated recorder generates an aural and/or visual signal if the required connections have been made to the recorder and the recorder circuits are functional. Therefore, an indication is given that the seisometer, or geophone, has been connected to the recorder, the recorder has received a coded radio signal and the coded radio signal included the address for the particular recorder, a magnetic tape cartridge is in place in the recorder but the end of tape has not been reached, the recorder battery is adequately charged, and the recorder reset has been checked. Consequently, an inoperative recorder can be detected by inspection without having to verify an actual recording.

Now, many techniques for generating and recording seismic waves are currently in use. Exploding-gas and compressed-air guns placed on the surface of the earth and dynamite are examples of high energy seismic sources which generate a sharp pulse (impulse) of seismic energy. Vibrators, which generate a "chirp" signal of seismic energy, and hammers are examples of low energy surface seismic sources. In the case of vibrators, the recorded seismic wave reflections and/or refractions are cross-correlated with a replica (called the "pilot signal") of the original "chirp" signal in order to produce recordings similar to those which would have been produced with a high energy impulsive seismic source. This process is known as "vibroseis."

Considered in more detail, vibroseis seismic prospecting, commercialized by Continental Oil Company, typically employs a large, vehicle-mounted vibrator as a seismic source. The vehicle is deployed to a prospect area, and the vibrator is positioned in contact with the surface of the earth. Thereafter, the vibrator is activated for imparting vibrations to the earth, thereby causing seismic waves to propagate through the subsurface formations. The seismic wave reflections and/or refractions are detected by seisometers, or geophones, deployed in the prospect area.

Advantageously, the use of a vibrator can be more economical than the use of dynamite. Furthermore, as compared to the use of a high energy impulsive seismic source, such as dynamite, the frequency of the seismic waves generated by a vibrator can be selected by controlling the frequency of the pilot signal to the power source, such as a hydraulic motor, which drives the vibrator. More particularly, the frequency of the pilot signal to the vibrator power source can be varied, that is, "swept," for obtaining seismic-trace data at different frequencies. Consider, for example, Doty et al. U.S. Pat. No. 2,688,124 which discloses how a low energy seismic wave, such as generated by a vibrator, can be used effectively for seismic prospecting if the frequency of the vibrator "chirp" signal which generates the seismic wave is swept according to a known pilot signal and the detected seismic wave reflections and/or refractions are cross-correlated with the pilot signal in order to produce seismic-trace recordings similar to those which would have been produced with a high energy impulsive seismic source. Typically, the pilot signal is a swept frequency sine wave which causes the vibrator power source to drive the vibrator for coupling a swept sine wave "chirp" signal into the earth. A typical swept frequency operation can employ, for example, a 10- to 20-second long sine wave "chirp" signal with a frequency sweep of 14 to 56 Hz. The swept frequency operation yields seismic-trace data which enables the different earth responses to be analyzed, thereby providing a basis on which to define the structure, such as the depth and thickness, of the subsurface formations.

Unfortunately, recorded seismic-trace data always includes some background (ambient) noise in addition to the detected seismic waves reflected and/or refracted from the subsurface formations (referred to as "seismic signal"). Ambient noise is not repeatable with or dependent on the seismic source. The ambient noise appears in many forms, such as atmospheric electromagnetic disturbances, wind, motor vehicle traffic in the vicinity of the prospect area, recorder electrical noise, etc.

When a high energy impulsive seismic source is used, such as dynamite, the level of the detected seismic signal is usually greater than the ambient noise. Use of the cableless seismic digital recording system disclosed in Broding et al. U.S. Pat. No. 3,806,864 is most advantageous in instances when seismic-trace data is generated by a high energy impulsive seismic source. This is because the data storage capacity of commercially available magnetic tape cartridges is adequate for recording the seismic-trace data.

However, when a low energy surface seismic source is used, such as a vibrator used in vibroseis seismic prospecting, the ambient noise can be at a level greater than the seismic signal. For that reason, seismic-trace records are often produced involving the repeated initiation of the low energy surface seismic source at about the same origination point, thereby producing a sequence of seismic-trace data based on seismic wave reflections and/or refractions that have traveled over essentially the same path and therefore have approximately the same travel times. Because the data storage capacity of commercially available magnetic tape cartridges such as used in the cableless seismic digital recording system disclosed in Broding et al. U.S. Pat. No. 3,806,864 is limited, the capacity is not always adequate for recording every repetition individually as well as accommodating the increase in record length required when a low energy surface seismic source is used.

In order to obviate the limitation of the data storage capacity of commercially available magnetic tape cartridges such as used in the cableless seismic digital recording system disclosed in Broding et al. U.S. Pat. No. 3,806,864, seismic-trace data generated by low energy surface seismic sources can be vertically stacked (summed or composited) prior to recording in order to economize tape usage. Weinstein et al. U.S. Pat. No. 3,946,357 and Broding U.S. Pat. No. 4,017,833, hereby also incorporated by reference into this specification to form a part thereof, disclose hard-wired digital circuitry in the recorder of a cableless seismic digital recording system for vertically stacking seismic-trace data acquired by the recorder. Weinstein et al. U.S. Pat. No. 3,946,357 discloses a recorder including an adder circuit which sums newly acquired seismic-trace data received from a shift register with previously accumulated seismic-trace data temporarily stored in random access memory between consecutive initiations of the seismic source, and the accumulated sum is later recorded on a magnetic tape cartridge. Broding U.S. Pat. No. 4,017,833 discloses a recorder including a plurality of recirculating dynamic shift registers connected in cascade for storing the accumulated sum between consecutive initiations of the seismic source in order to economize power consumption. A co-pending patent application of Read et al. Ser. No. 454,405 filed Dec. 29, 1982, filed on the same date as this application and assigned to a common assignee and hereby incorporated by reference into this specification to form a part thereof, discloses microcomputer means in the recorder of a cableless seismic digital recording system for weighting as well as vertically stacking consecutive traces for improving the signal-to-noise ratio of seismic-trace data collected during seismic prospecting with low energy surface seismic sources.

The seismic-trace data processing circuits (the hard-wired digital circuitry disclosed in Weinstein et al. U.S. Pat. No. 3,946,357 and Broding U.S. Pat. No. 4,017,833 and the microcomputer means disclosed in the aforementioned Read et al. application) are highly desirable for processing seismic-trace data during seismic prospecting with low energy surface seismic sources. However, incorporation of such seismic-trace data processing circuits in cableless seismic digital recording system recorders has resulted in increased complexity of the recorder circuits. The need exists for not only checking the functionality of those recorder circuits checked as disclosed in Broding U.S. Pat. No. 3,952,283 but also testing the operability of more complex seismic-trace data processing circuits of a recorder of a cableless seismic digital recording system used during seismic prospecting with low energy surface seismic sources where the seismic-trace data must at least be summed prior to recording. This invention is directed to facilitate incorporation of test capabilities in a cableless seismic digital recording system recorder for checking the operability of the recorder seismic-trace signal acquisition as well as seismic-trace data processing circuits used during seismic prospecting with any type of seismic source, including high energy impulsive seismic sources and low energy surface seismic sources.

SUMMARY OF THE INVENTION

In accordance with the invention, means is provided in a cableless seismic digital recording system recorder used during seismic prospecting with any type of seismic source, including high energy impulsive seismic sources, such as dynamite, and low energy surface seismic sources, such as a vibrator, for testing the operability and for facilitating the maintenance of the recorder. The recorder preferably includes a microprocessor circuit having a read only memory which stores sets of programmed instructions. In accordance with a preferred embodiment of the invention, logic control signals needed for testing the operability of the recorder are generated by diagnostic routines contained within the programmed instructions. Tests are performed in response to actuable means, such as switches, of a control panel included in the recorder. The results of the tests are preferably displayed on the control panel, for example, as codes on a display means, such as an incandescent display.

The recorder preferably includes means for illuminating the recorder's displays; means for displaying the recorder's serial number; means for collecting data and/or displaying excursions of the recorder's gain-ranging amplifier, preferably without recording data on the recorder's magnetic cartridge tape; means for initiating a test of the recorder's arithmetic processing unit and random access memory and displaying a coded test result; and means for performing a cyclic redundancy check of the recorder's read only memory and displaying a coded test result. However, in accordance with various embodiments of the invention, only selected features for testing the operability and facilitating the maintenance of the recorder can be incorporated if only such features are desired.

In accordance with one embodiment of the invention, actuable means is provided in the recorder of a cableless seismic digital recording system, the actuable means being connected to display means and the recorder's gain-ranging amplifier for displaying excursions of the amplifier. Furthermore, a terminating resistor can be connected across the recorder's seismometer input connector for the amplifier, the actuable means being connected to the display means and the amplifier for indicating the operability of the amplifier. In either event, the excursions of the amplifier can be displayed without recording on the recorder's magnetic cartridge tape.

In another embodiment of the invention, actuable means is provided in the recorder, the actuable means being connected to the recorder's arithmetic processing unit and random access memory for testing the operability of the arithmetic processing unit and random access memory. The actuable means produces a test result code which is displayed by display means.

In yet another embodiment of the invention, actuable means is provided in the recorder, the actuable means being connected to the recorder's read only memory for performing a cyclic redundancy check of the read only memory. The actuable means produces a test result code which is displayed by display means.

There are further embodiments of the invention. In one embodiment of the invention, for example, actuable means is provided connected to display means for testing the display means by illuminating the display means so that a visual inspection of the display means can be conducted.

Finally, in accordance with the invention a method is provided for testing the weighting and vertical stacking operation of the recorder. The preferred method includes connecting the recorder to a test signal source; acquiring and weighting first and second test signals; vertically stacking the weighted test signals; and reproducing the weighted and vertically stacked test signals, the process preferably being repeated for each weighting mode. Preferably, the weighted and vertically stacked test signals are normalized before being reproduced.

Therefore, in accordance with various embodiments of the invention, display means included in the recorder can be tested for assuring that the display means is functional. The serial number of the recorder can be displayed for the purpose of identifying the recorder. Also, knowledge of the serial number permits the operability of the recorder to be charted over time. The gain-ranging amplifier included in the recorder can be tested by displaying the excursions of the gain-ranging amplifier without recording on the magnetic cartridge tape included in the recorder, thereby conserving tape usage. The arithmetic processing circuit and random access memory of the seismic-trace data processing means included in the recorder can be tested with a coded result being displayed. A cyclic redundancy check can be performed on the read only memory included in the recorder with a coded result being displayed. Finally, the weighting and vertical stacking operation of the recorder can be tested.

The tests in accordance with the invention check reliability of the recorder. The test also facilitate maintenance of a recorder which does not function properly.

BRIEF DESCRIPTION OF THE DRAWINGS

The above and other features of this invention and a better understanding of the principles and details of the invention will be evident to those skilled in the art in view of the following description of the preferred embodiments given in conjunction with the accompanying drawings, in which:

FIG. 4, comprising

By way of background, in a cableless seismic digital recording system, each of a plurality of small, portable recorders is placed near and connected to a seismometer, for example, in a prospect area for recording one trace of a multiple seismic-trace record. Each recorder is preset to be responsive to and activated by coded signals transmitted over a communications link, preferably a radio communications link, from a control point to all of the recorders. Initially, in producing a seismic-trace record, the coded signals transmitted to all recorders contain coded signals corresponding to the preset indicia of only those recorders desired to be activated. Also, record-header block identification data and recording-parameter data are transmitted from the control point for operation of the activated recorders and to be recorded digitally on the magnetic tape cartridges of the activated recorders together with additional identifying and operating information peculiar to and entered in each recorder. Immediately following is transmitted a zero-time mark. The identifying and operating information and zero-time mark are recorded with the timed sequence of digitized seismic-trace data associated with the corresponding seismometer. At the end of the recording, the activated recorders automatically de-activate, reset themselves, and assume radio standby status in readiness for the next activation and digital recording sequence. Those recorders of the larger array which do not receive the particular coded signals necessary for them to be activated remain in an intermediate standby status without any movement of the recording tape. When the location of the recorder and corresponding seismometer is to be changed, the recorded tape can be removed, and a fresh supply of blank recording tape inserted. The recorded tapes can then be transported to a central location for playback and storage of the seismic-trace data in any desired form and format of digital-computer storage and work tape.

Figure 1A:
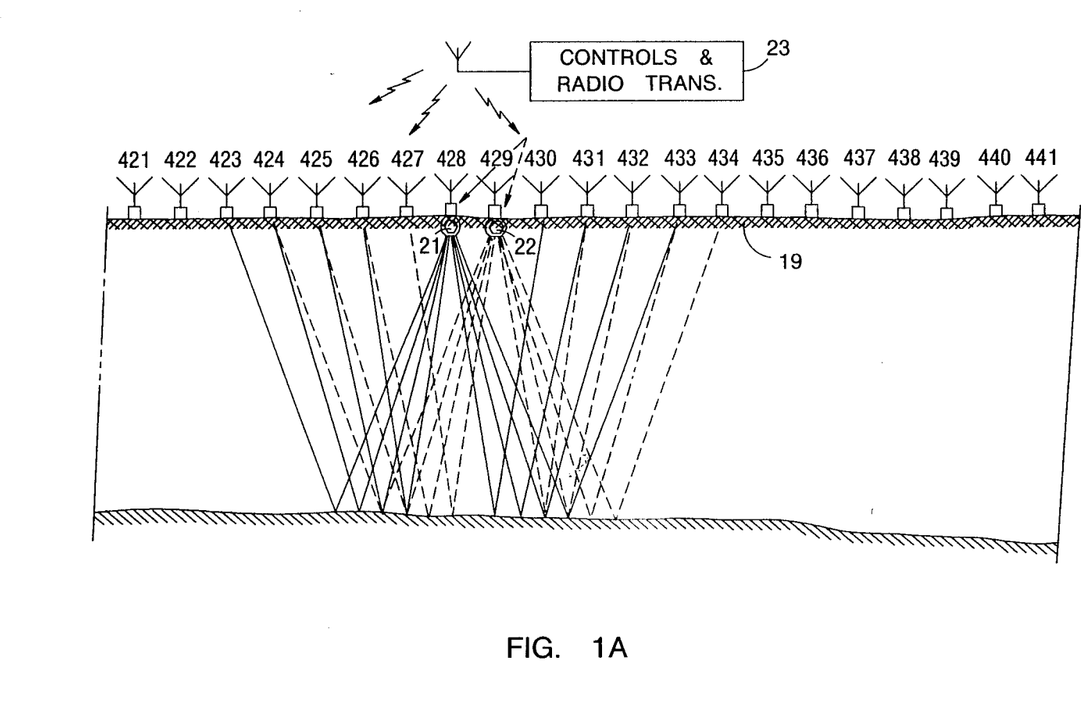
FIG. 1A is a diagrammatic cross-section of the earth which shows a field surveying operation using a cableless seismic digital recording system in accordance with the invention.

By way of further background, with reference now to the drawings. FIG. 1A shows in diagrammatic fashion an earth cross-section with recorders 421–441 positioned for recording seismic-trace data. Spaced at intervals along a profile survey line extending along the earth's surface 19, the recorders 421–441 each include a radio receiver circuit, having an antenna, and a small magnetic tape device, preferably of the cartridge type. Each of the recorders 421–441 is connected to at least one seismometer and preferably to a group of interconnected seismometers 20 producing a single seismic-trace signal in the manner customary in seismic prospecting as shown in FIG. 1B.

At or near the positions occupied by the recorders 428 and 429 in FIG. 1A are respectively shown diagrammatically a first seismic source 21 and a second seismic source 22. At any convenient control point, there is a control means 23, including control circuits and a radio transmitter, which controls and coordinates the operation of the recorders 421–441. A preferred control means is more fully disclosed in a co-pending patent application of Bogey et al. Ser. No. 454,402 Dec. 29, 1982 filed on the same date as this application and assigned to a common assignee and hereby incorporated by reference into this specification to form a part thereof.

Figure 1B:
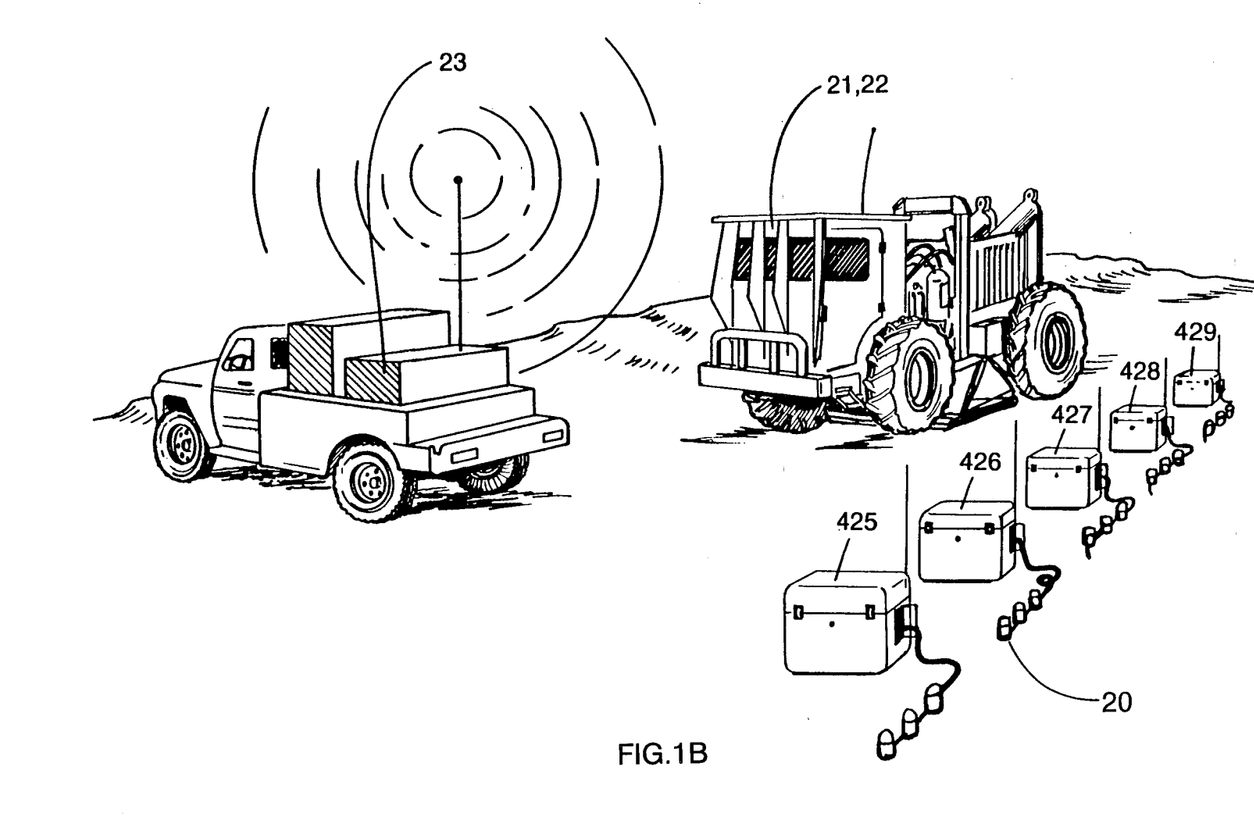
FIG. 1B illustrates deployment of the cableless seismic digital recording system shown in FIG. 1A.

The various seismometers or seismometer groups 20 are initially deployed along the profile survey line, and each of the seismometers or seismometer groups is then electrically connected to the amplifier input terminal of the associated one of the recorders 421–441 as shown more clearly in FIG. 1B. For the purposes of illustration, the reference numbers 421–441 can be considered to function also as identification numbers for the locations of the seismometers or seismometer groups 20. As each seismometer or seismometer group 20 and associated one of the recorders 421–441 are placed at a location, that location number, or address, is entered into the recorder to become both the coded signal which will subsequently activate the recorder, as well as the recorder position identification to be supplied by the recorder and recorded as part of the record-header block identification data.

Seismic-trace data acquisition by each of the recorders is initiated by the coded radio signals transmitted over the one-way radio communications link with a single transmitter at the control point, or base station. An almost unlimited number of recorders can be remotely deployed simultaneously at any location in the prospect area within the radio transmission range of the control point.

DESCRIPTION OF THE PREFERRED EMBODIMENTS

Figure 2:
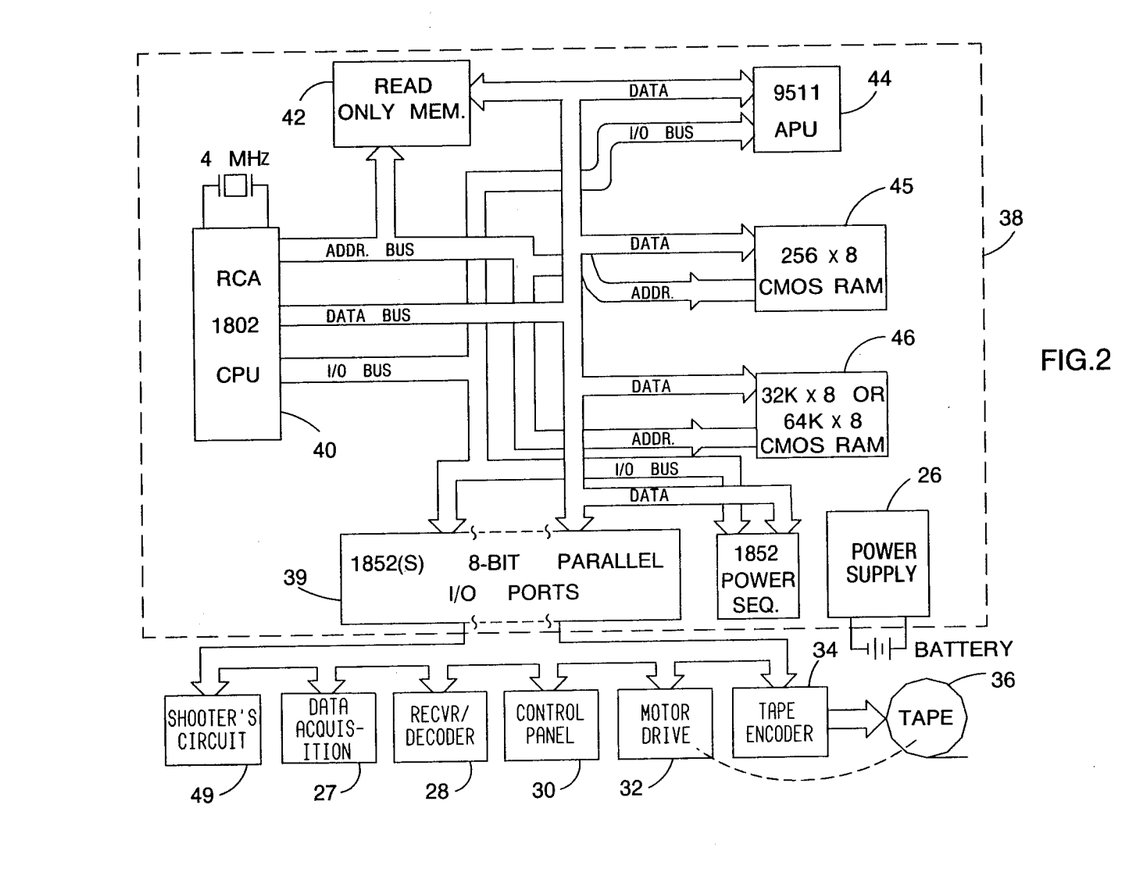
FIG. 2 is a block diagram of electronic circuitry for a cableless seismic digital recording system recorder in accordance with the invention.

FIG. 2 shows in block diagram form the circuitry of each of the recorders 421–441 in FIG. 1 for recording seismic-trace data. The circuitry is more fully disclosed in the aforementioned co-pending Read et al. application. The circuitry shown in FIG. 2 is capable of recording seismic-trace data generated by any type of seismic source, including high energy impulsive seismic sources and low energy surface seismic sources.

The structure and operation of the recorders 421–441 in FIG. 1 as used in seismic prospecting are disclosed in the aforementioned co-pending application of Read et al. This invention provides means in each of the recorders 421–441 for testing the operability and for facilitating the maintenance of the recorder. However, a general description of the structure and operation of the recorders 421–441 will now be given for the purpose of facilitating an understanding of the test features incorporated in each of the recorders in accordance with the invention.

Generally, each of the recorders 421–441 includes electronic and electromechanical circuitry as shown in FIG. 2, namely, a power supply circuit 26, a data acquisition circuit 27, a radio receiver circuit 28, a control panel circuit 30, and a magnetic tape cartridge recorder, which includes a drive circuit 32 and an encoder circuit 34, the latter being for encoding seismic-trace data to be recorded on magnetic cartridge tape 36. Each of the recorders 421–441 in FIG. 1 also includes a microcomputer means 38 as shown in FIG. 2. The microcomputer means 38 includes an input/output circuit 39 which is the interface between the microcomputer means and the other electronic and electromechanical circuitry. The microcomputer means 38 also includes a microprocessor circuit 40 having an associated scratch pad random access memory 45. The programmed instructions for the microprocessor circuit 40 are contained in a read only memory (ROM) 42. The seismic-trace data weighting and vertical stacking method which forms the subject matter of a co-pending patent application of Warmack Ser. No. 454,401, filed Dec. 29, 1982 or the subject matter of a co-pending patent application of Smith et al. Ser. No. 454,403, filed on the same date as this application and assigned to a common assignee and hereby incorporated by reference into this specification to form a part thereof, is preferably included in the sets of programmed instructions stored in the ROM 42. The microcomputer means 38 also includes an arithmetic processing unit (APU) 44, which performs weighting and vertical stacking under control of the microprocessor circuit 40 during seismic prospecting with a low energy surface seismic source, and a random access memory (RAM) 46 for storing seismic-trace data acquired during seismic prospecting with a high energy impulsive seismic source as well as weighted and vertically stacked seismic-trace data during seismic prospecting with a low energy surface seismic source between initiations of the low energy surface seismic source. Seismic-trace data stored in the RAM 46 is reproducibly recorded on the magnetic cartridge tape 36.

Coded radio signals transmitted by the control means 23 in FIG. 1 initiate an operation or sequence of operations by each of the activated recorders 421–441 from a set of predetermined operations embodied in the programmed instructions stored in the ROM 42 in FIG. 2. For example, on the one hand, when one of the activated recorders 421–441 in FIG. 1 receives coded radio signals indicative of the initiation of a high energy impulsive seismic source, the seismic-trace signal is sampled, digitized, and stored in the RAM 46 in FIG. 2. The seismic-trace data can then be normalized and recorded on the magnetic cartridge tape 36. On the other hand, when one of the activated recorders 421–441 in FIG. 1 receives coded radio signals indicative of the initial initiation of a low energy surface seismic source, the seismic-trace signal is sampled, digitized, weighted, and stored in the RAM 46 in FIG. 2. For a subsequent initiation of the low energy surface seismic source, the stored seismic-trace data from previous initiations can be vertically stacked, that is, summed, with the weighted seismic-trace data representative of the subsequent initiation. The procedure can be successively repeated until the weighted seismic-trace data representative of a selected number of initiations of the low energy surface seismic source has been vertically stacked. The accumulated seismic-trace data can then be normalized and recorded on the magnetic cartridge tape 36.

Figure 3:
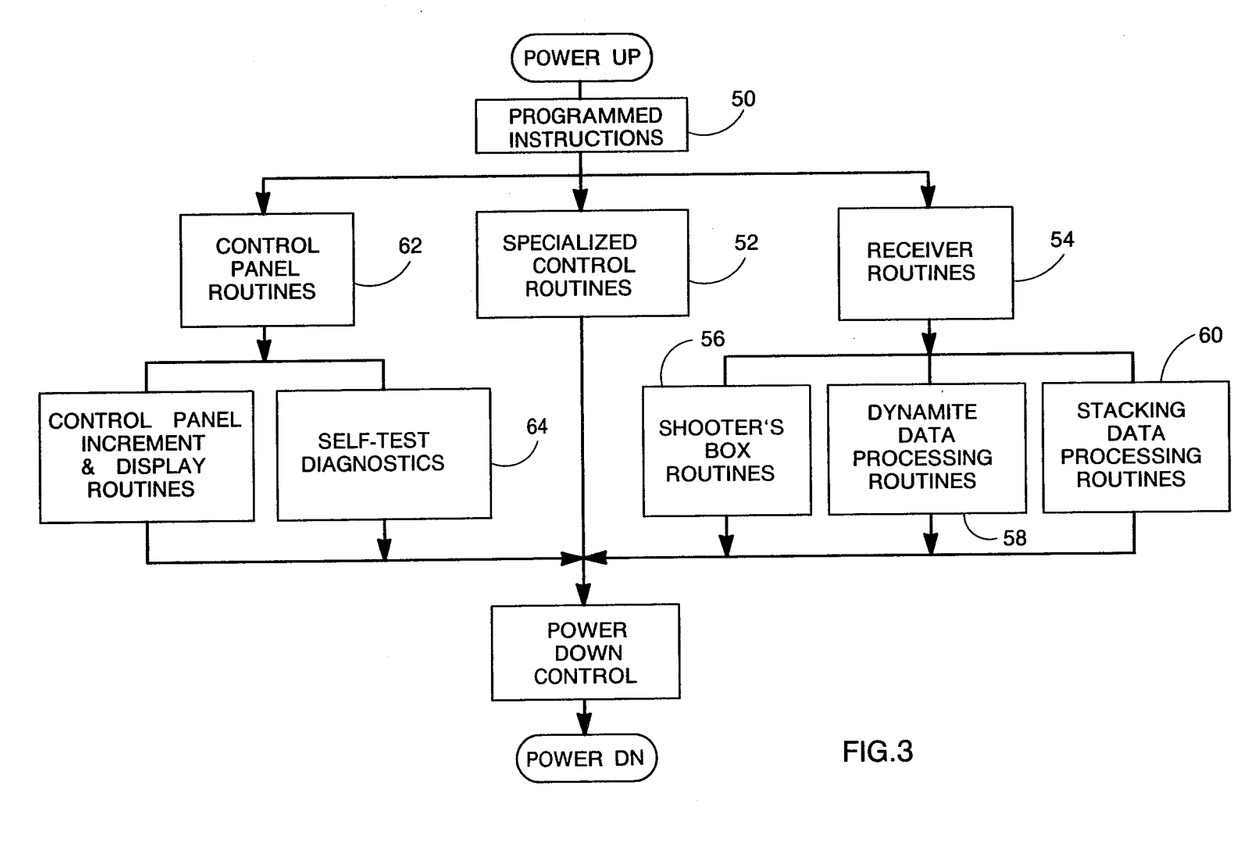
FIG. 3 illustrates the test features of the invention included in the cableless seismic digital recording system recorder shown in FIG. 2.

FIG. 3 illustrates the modes of operation and test features included in the sets of programmed instructions 50 stored in the ROM 42 in FIG. 2 of each of the recorders 421–441 in FIG. 1. Logic control signals needed for the circuits of each of the recorders 421–441 (power up/down, sampling, tape transport on/off, etc.) are generated by specialized control routines 52 as shown in FIG. 3. Receiver routines 54 interpret the coded radio signals transmitted by the control means 23 and cause each of the recorders 421–441 in FIG. 1 which are activated to be placed in various of the following operational modes.

With reference again to FIG. 3, in accordance with shooter's box routines 56, each of the activated recorders 421–441 in FIG. 1 can be used for initiating the seismic source. When the seismic source location transmitted by the control means 23 corresponds to the preprogrammed address of one or more of the activated recorders 421–441, a shooter's circuit 49 as shown in FIG. 2 in each recorder will energize at a designated source initiation time. The shooter's circuit 49 can be used to detonate a dynamite charge or initiate a sweep generator, for example. The initiation time is determined by a variable advance which can be entered on the control panel 30 as will be described in more detail in connection with FIG. 4. Multiple shooter's boxes can be selected simultaneously for initiating multiple shot seismic sources. The control means 23 in FIG. 1 can initiate a simultaneous selection of multiple shooter's boxes by transmitting a "shooter's call" of 9900 to 9999 in the instance where each of the recorders 421–441 selected as a shooter's box has an address within these limits. Consequently, as many as 100 unique shooter's boxes can be simultaneously selected.

Seismic-trace signals representative of the seismic source can be recorded by the same recorder which initiates the seismic source. Uphole signals indicative of the initial seismic wave from a high energy impulsive seismic source are detected and recorded, and the "uphole" time, that is, the time delay between initiation and detection of the direct seismic wave, can be calculated. The uphole time is also recorded in the header of the following record and can be displayed. The first or last initiation of a sequence of low energy surface seismic source initiations can be selectively recorded. Pilot signals from multiple vibrator initiations can be recorded for similarity analysis.

With reference again to FIG. 3, dynamite data processing routines 58 are used with high energy impulsive seismic sources. In accordance with the dynamite data processing routines 58, each of the activated recorders 421–441 in FIG. 1 merely records seismic-trace data. The seismic-trace data is not weighted or vertically stacked in the dynamite data processing mode. After recording is complete, each of the activated recorders 421–441 is de-activated. Gain-ranging amplification excursions can be displayed as will be described later.

With reference again to FIG. 3, stacking data processing routines 60 are used with low energy surface seismic sources. In accordance with the stacking data processing routines 60, several weighting and recording modes are available.

The weighting modes available in each of the activated recorders 421–441 in FIG. 1 are selectable by coded radio signal. They preferably include: IPW(0), unweighted floating-point sum; IPW(1), inverse average absolute value weighting; IPW(2), inverse average square value weighting; and IPW(4), inverse average fourth-power weighting.

In response to the initial initiation of a low energy surface seismic source the seismic-trace signal is sampled, digitized, weighted, and stored in the RAM 46 in FIG. 2. For subsequent initiations of the low energy surface seismic source, the stored seismic-trace data from the previous initiation is vertically stacked, that is, summed, with the weighted seismic-trace data representative of the subsequent initiations. The procedure is successively repeated until the weighted seismic-trace data representative of a selected number of initiations of the low energy surface seismic source has been vertically stacked.

Preferably, weighting values for each seismic-trace signal are obtained by linearly interpolating between the weighting values computed over predetermined portions of the traces, or windows. Computation and application of the weighting values along with vertical stacking, or summation, is preferably accomplished in a 4-byte format. Each set of seismic-trace data for a sequence of initiations is weighted and summed in the RAM 46. After the last set of weighted seismic-trace data in a sequence is vertically stacked, the cumulative sum stored in the RAM 46 is preferably normalized and then recorded on the magnetic cartridge tape 36. After normalization, the seismic-trace data is preferably converted back to a 2-byte format prior to being recorded.

In the stacking data processing mode, the recording is either "immediate," that is, at the end of the current sequence of operations, or "delayed," that is, at the beginning of the next sequence of operations (when a coded radio signal is transmitted to acquire the first set of seismic-trace data in the subsequent sequence). Following the "immediate" recording, each of the activated recorders 421–441 in FIG. 1 is de-activated; if a "delayed" recording is made, each recorder remains activated between initiations. Gain-ranging amplification excursions can be displayed after each seismic-trace signal acquisition cycle as will be described later.

In the stacking data processing mode, the activated recorders 421–441 remain activated between initiations so as to retain the accumulated seismic-trace data in RAM 46 in FIG. 2. If, however, the time between any two initiations in a sequence reaches ten minutes, for example, a timer in each of the activated recorders 421–441 in FIG. 1 causes each recorder to be de-activated.

Considered in more detail, when the recorders 421–441 are activated in the stacking data processing mode, the ten-minute timer is started to prevent a possible recorder lock-up with power on, unnecessarily consuming battery power. Therefore, the total time between initiations cannot reach ten minutes, or the activated recorders 421–441 are automatically de-activated, and, consequently, any vertically stacked seismic-trace data previously acquired is lost. Should conditions dictate that the time allowance be exceeded, a TEST CALL transmitted by the control means 23 to any of the recorders 421–441 will reset the timer of each of the recorders. Furthermore, if such a TEST CALL is transmitted, an aural alarm in the recorder which is TEST CALLed sounds before the recorder is de-activated.

As shown in FIG. 3, control panel routines 62 are included in the sets of programmed instructions stored in the ROM 42 in FIG. 2. The control panel routines 62 in FIG. 3 are executed in response to the actuation of switches included in the control panel 30 in FIG. 2.

In accordance with the invention, diagnostic routines 64 in FIG. 3 are also included in the sets of programmed instructions stored in the ROM 42 in FIG. 2. The diagnostic routines 64 in FIG. 3 are executed in connection with the control panel routines 62 upon actuation of certain switches included in the control panel 30 in FIG. 2. Logic signals needed for testing the operability of each of the recorders 421–441 in FIG. 1 are generated by the diagnostic routines 64 in FIG. 3.

FIG. 4 shows the control panel 30 of each of the recorders 421–441 in FIG. 1. The switches included in the control panel 30 in FIG. 4 under control of the control panel routines 62 in FIG. 3 and are preferably pushbutton switches which can be used for performing "alternate" functions in a manner similar to the pushbuttons included in hand-held calculators. There are six display select switches generally indicated by the numeral 72 in FIG. 4.

Figure 4A:
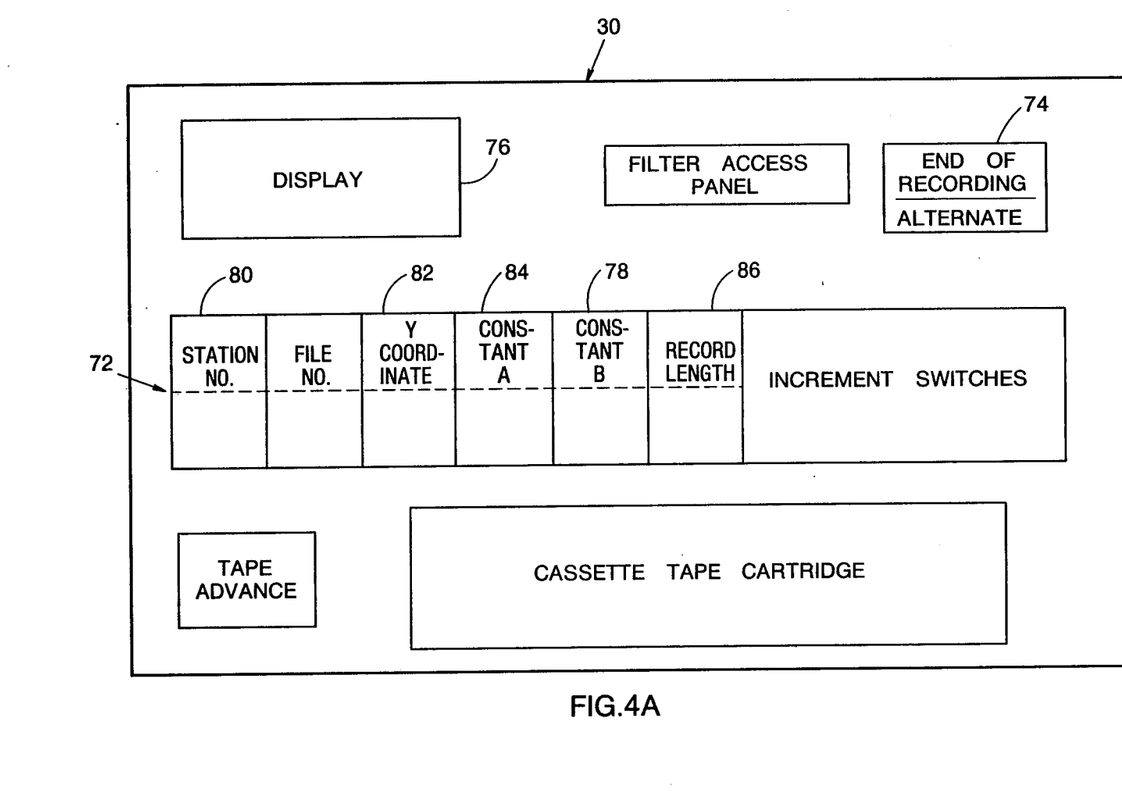
FIGS. 4A and 4B, shows the control panel of the cableless seismic digital recording system recorder shown in FIG. 2.
Figure 4B:
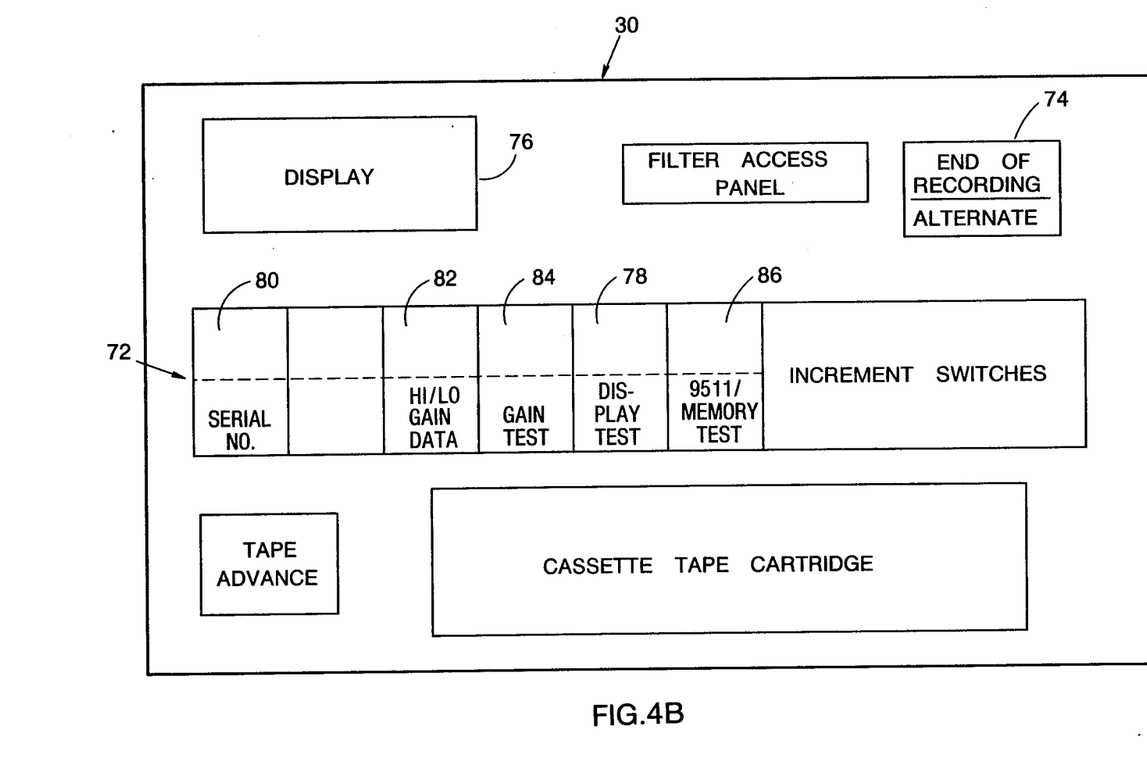

The primary functions of the six display select switches 72 are shown in FIG. 4A. An END OF RECORDING (EOR) pushbutton 74 shown in FIG. 4, in addition to performing the end-of-recording function, serves as an alternate key, much like that found on a hand-held calculator. The alternate functions of the display select switches 72, illustrated in FIG. 4B, including test features in accordance with the invention, are performed whenever the EOR pushbutton 74 is depressed simultaneously with the display select switches 72.

The primary and alternate functions which relate to the operation of the recorders 421–441 in FIG. 1 are disclosed in the aforementioned Read et al. application. The alternate functions which relate to the test features of the invention preferably include: SERIAL NO., which causes the serial number of each of the recorders 421–441 to be displayed by a display 76 as shown in FIG. 4, preferably a four-digit incandescent display; GAIN TEST, which collects seismic-trace data and causes the gain-ranging amplifier excursions to be displayed by the display 76 without recording data on tape, indicating the status of the data acquisition circuit 27 in FIG. 2; DISPLAY TEST, which lights all segments of the display 76 in FIG. 4; and APU/MEMORY TEST, which initiates a test of the arithmetic processing unit 44 and RAM 46 in FIG. 2 and causes a coded test result to be displayed by the display 76 in FIG. 4. (A cyclic redundancy check (CRC) is also performed on the ROM 42 in FIG. 2. A CRC comprises the addressing of selected storage locations in the ROM 42, reading out of data in those storage locations, processing the data by means of some algorithm for generating a number, and comparing the number with a reference, for example, a number in a look-up address.)

The test data provided by the alternate functions indicated above is valuable during operation and maintenance of the recorders 421–441 in FIG. 1. Such functions are not known in commercially available cableless seismic digital recording system recorders.

The following describes the procedures for field setup and testing of each of the recorders 421–441. It is assumed that the recorders 421–441 have been deployed as illustrated in FIG. 1.

Confidence in the operability of the recorders 421–441 can be established by routine testing. The testing can be categorized into control panel tests, basic functional tests, and, finally, weighting and vertical stacking tests.

Included in the tests are a visual test of the display 76 in FIG. 4, a dynamic test of the random access memory circuits 45 and 46 and arithmetic processing unit 44 circuit, a CRC of the ROM 42, and a gain test for verifying the operation of the gain-ranging amplifier included in the data acquisition circuit 27 in FIG. 2. Also, the serial number of each of the recorders 421–441 in FIG. 1 can be displayed. The various tests are as follows.

The DISPLAY TEST is initiated by depressing simultaneously the EOR pushbutton 74 and a CONSTANT B display select switch 78 in FIG. 4 which causes "8888" to be displayed by the display 76. A visual inspection can then be made for the purpose of checking for burned-out display segments. When the CONSTANT B display select switch 78 is released, the recorder is de-activated.

Simultaneously depressing the EOR pushbutton 74 and a STATION NO. display select switch 80 causes the serial number of the recorder to be displayed by the display 76. Consequently, the serial number of the recorder can be identified, and the operability of the recorder can be charted over time.

The EOR pushbutton 74 and a Y COORDINATE display select switch 82 when depressed simultaneously cause the high and low gain data collected during the last seismic-trace recording, or after running a gain test diagnostic routine, to be displayed by the display 76. In the latter instance, a 500-ohm terminating resistor is connected across the seismometer connector of the recorder. Thereafter, simultaneously depressing the EOR pushbutton 74 and a CONSTANT A display select switch 84 executes the gain test. The display 76 goes blank, and an aural alarm sounds. The aural alarm is sounded for approximately eight seconds while seismic-trace data from the seismometer connector is read in through the data acquisition circuit 27 in FIG. 2, and the highest and lowest gain values encountered are stored. Upon completion of the test, the aural alarm is stopped, and the display 76 in FIG. 4 illuminates and displays the highest and lowest gain values encountered as seismic-trace data was read in from the seismometer connector (the gains should be from 12 to 15). Since gain in the recorder is preferably represented in 6 dB steps, a display of "1506," for example, indicates that the highest gain used during the eight-second test was 15, or 90 dB, while the lowest gain was 6, or 36 dB. Used primarily as an indication of the gain-ranging amplifier status, the gain test can be used in the field for determining the proper setting for the preamplifier gain. Gain data remains displayed for approximately three seconds or can be recalled by simultaneously depressing the EOR pushbutton 74 and the Y COORDINATE display select switch 82.

Simultaneously depressing the EOR pushbutton 74 and a RECORD LENGTH display select switch 86 executes a dynamic test of the random access memory circuits 45 and 46, the arithmetic processing unit circuit 44, and a CRC of the ROM 42 in FIG. 2. The display 76 in FIG. 4 indicates which test is being performed by illuminating a 1, 2, or 3, respectively, after which a status code is displayed which shows the results of the test. The status code preferably remains displayed for about three seconds. A definition of the preferred status codes is given in Table I below.

TABLE I

| Code | Memory/APU/CRC Test Status Codes Status |
|---|---|
| 0000 | Memory Good, APU Good, CRC Good |
| 0095 | Memory Good, APU Bad, CRC Not Tested |
| 0055 | Memory Good, APU Good, CRC Bad |
| 2800 | Scratch Pad Memory Bad, APU Good, CRC Good |
| 2895 | Scratch Pad Memory Bad, APU Bad, CRC Not Tested |
| 2855 | Scratch Pad Memory Bad, APU Good, CRC Bad |
| XX00 | Stacking Memory Bad, APU Good |
| XX95 | Stacking Memory Bad, APU Bad |
| XX55 | Stacking Memory Bad, APU Good, CRC Bad |

"XX" reads "32" for a 32K RAM 46 and "64" for a 64K RAM 46 in FIG. 2.

Should the display 76 in FIG. 4 illuminate an invalid status code, the random access memory circuits 45 and 46 in FIG. 2 can be checked and the test rerun for confirming the arithmetic processing unit 44 and ROM 42 status. The scratch pad random access memory 45 will fail any time a single memory location is found bad; however, the test of the RAM 46 allows up to five bad locations and will display the number of bad locations encountered instead of displaying a 32" or "64" in the status word. A CRC failure ("55") indicates that the ROM 42 has failed.

Finally, a test can be conducted of the weighting and vertical stacking operation. However, before the stacking data processing mode tests are described, operation of the recorders 421–441 in FIG. 1 in the stacking data processing mode will be described to provide familiarization with expected results.

Each of the recorders 421–441 determines the particular stacking data processing mode by interrogating the SPARE transmitted by the control means 23 among the coded radio signals. The preferred codes for the SPARE are shown in Table II.

TABLE II

| SPARE Codes | |
|---|---|
| Digit 1 | |
| 0 | Dynamite (non-stacking) Mode |
| 1 | Stacking Mode |
| Digit 2 | |
| 0 | Normal processing |
| 1 | Call for normalization after stacking, and record on tape at next call (Stacking Mode). |
| 8 | Master reset |
| 9 | Call for normalization after stacking, and record on tape immediately thereafter (Stacking Mode). The recorder powers down immediately after recording on tape. |
| Digit 3* | |
| 0 | IPW(0) |
| 1 | IPW(1) |
| 2 | IPW(2) |
| 4 | IPW(4) |

*Default values are IPW(2) for 3, 5, 6, and 7; IPW(0) for 8; and IPW(1) for 9.

Figure 5:
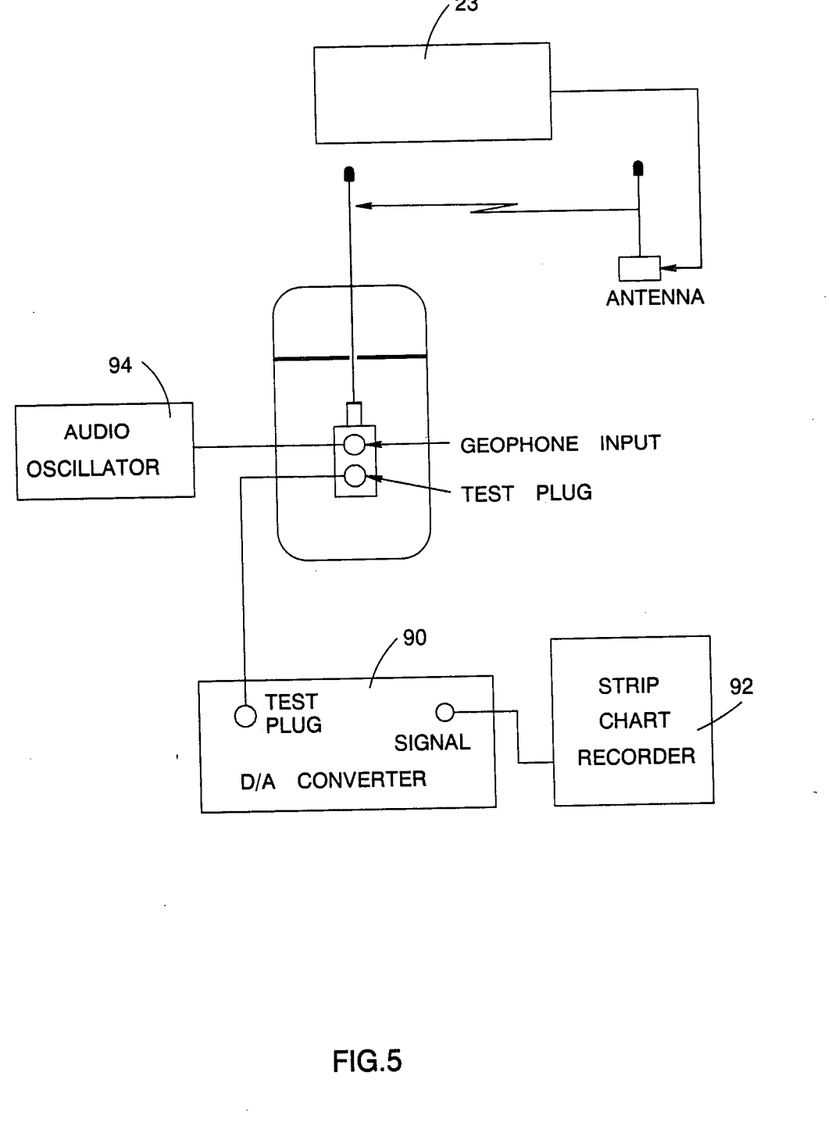
FIG. 5 shows a test setup in accordance with the invention.

In accordance with the test of the stacking data processing mode, the test setup shown in FIG. 5 is preferably assembled. A digital-to-analog converter 90 and a strip chart recorder 92 are for monitor purposes. An oscillator 94 is an audio-frequency oscillator. The oscillator 94 is preferably a low-distortion (0.1% maximum) audio sine wave circuit having, for example, 15 Hz and 30 Hz outputs capable of 0 dB (calibrated) 100 mV RMS with −30 to −36 dB attenuation from the 0 dB output level.

The stacking data processing mode test can be conducted as follows: (a) the recorder is set for 200 mV input range, five-second record length, all filters out; (b) the control means 23 sends two transmissions separated by 14 seconds in the IPW(0) mode; (c) the seismometer input following the first transmission is 30 Hz at −30 to −36 dB, and the seismometer input following the second transmission is 15 Hz at 0 dB from the oscillator 94 (A third or final "normalization" transmission is also preferably sent, which causes the weighted and vertically stacked data to be normalized.); (d) the above steps (b) and (c) are repeated with the control means alternatively set for the IPW(1), IPW(2), and IPW(4) modes.

A second or two of graph paper is obtained from the strip chart recorder 92 for each of the four records. With the four weighting and vertical stacking modes, various results which are related to the 15 Hz and 30 Hz signals are obtained as explained below in connection with FIG. 6.

Figure 6:
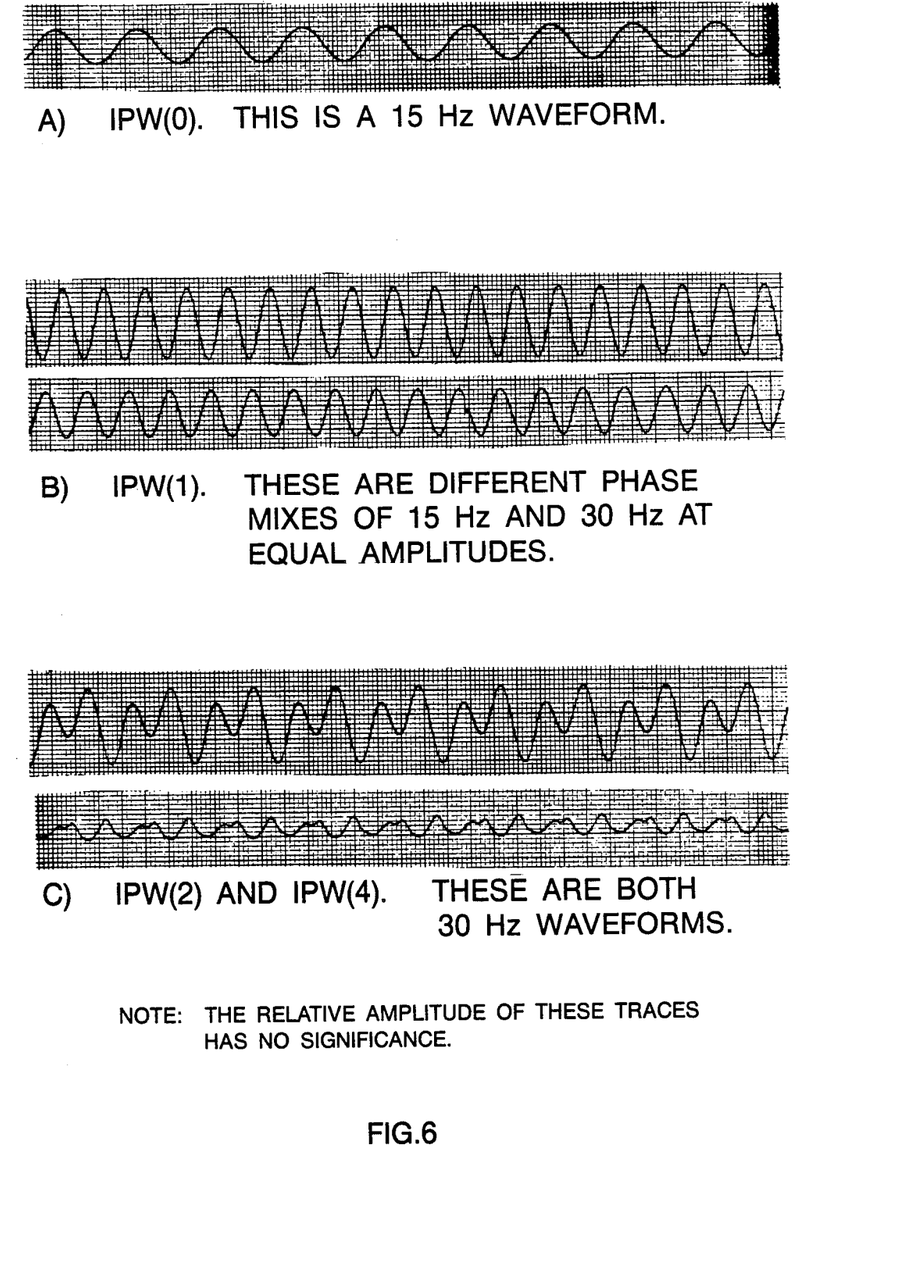
FIG. 6 illustrates the desired test signals obtained through the use of the test setup shown in FIG. 5.

The IPW(0) trace should look like FIG. 6A. In the IPW(0) mode, the two traces (15 Hz and 30 Hz) are added directly with no adjustment to the amplitudes. Since the 30 Hz signal is so much smaller than the 15 Hz, only the 15 Hz will be seen. The IPW(1) trace should look something like FIG. 6B and should definitely not appear as in FIG. 6A or 6C. In the IPW(1) mode, the small amplitude 30 Hz signal is digitally amplified to be the same amplitude as the 15 Hz, then they are added. The relative phases of the 15 Hz and 30 Hz signals will vary from trace to trace (In the IPW(1) mode, the appearance of the trace will vary somewhat from test to test). The IPW(2) and IPW(4) traces should look like FIG. 6C. In the IPW(2) and IPW(4) modes, the large amplitude 15 Hz signal is greatly attenuated relative to the amplitude of the 30 Hz signal. Therefore, the trace shows the strong dominance of the 30 Hz signal.

The tests in accordance with the invention check the reliability of the cableless seismic digital recording system recorder. The tests also facilitate maintenance of a recorder which does not function properly.

While the invention has been described with a certain degree of particularity, it is manifest that many changes can be made in the details of construction and the arrangement of components without departing from the spirit and scope of this disclosure. It is understood that the invention is not limited to the exemplified embodiments set forth herein but is to be limited only by the scope of the appended claims, including the full range of equivalency to which each element thereof is entitled.

What is claimed is:

1. A method for testing a cableless seismic digital recording system recorder capable of weighting and vertically stacking seismic-trace data for determining the operational status and for facilitating the maintenance of the recorder, comprising the steps of:
   a. connecting the recorder to a source of test signals;
   b. transmitting a coded signal to the recorder for selecting at least one weighting mode;
   c. transmitting a coded signal to the recorder for initially activating the recorder to receive a first test signal;
   d. acquiring the first test signal during the initial activation of the recorder;
   e. weighting the acquired first test signal during the initial activation of the recorder according to the selected weighting mode;

f. transmitting a coded signal to the recorder for subsequently activating the recorder to receive a second test signal;
g. acquiring the second test signal during the subsequent activation of the recorder;
h. weighting the acquired second test signal during the subsequent activation of the recorder according to the selected weighting mode;
i. vertically stacking the weighted first and second test signals; and
j. reproducing the weighted and vertically stacked first and second test signals for indicating the operability of the weighting mode.

2. The method of claim 1, further comprising the steps of transmitting a coded signal to the recorder for normalizing the weighted and vertically stacked first and second test signals and normalizing the weighted and vertically stacked first and second test signals prior to reproducing the weighted and vertically stacked first and second test signals.

3. The method of claim 1 wherein the recorder includes a plurality of weighting modes, further comprising the step of repeating steps b through j for each of the plurality of weighting modes.

4. The method of claim 3, further comprising the steps of transmitting a coded signal to the recorder for normalizing the weighted and vertically stacked first and second test signals and normalizing the weighted and vertically stacked first and second test signals prior to reproducing the weighted and vertically stacked first and second test signals.

* * * * *